(No Model.)
D. W. MAGEE.
FLEXIBLE PIPE JOINT.
No. 551,193. Patented Dec. 10, 1895.
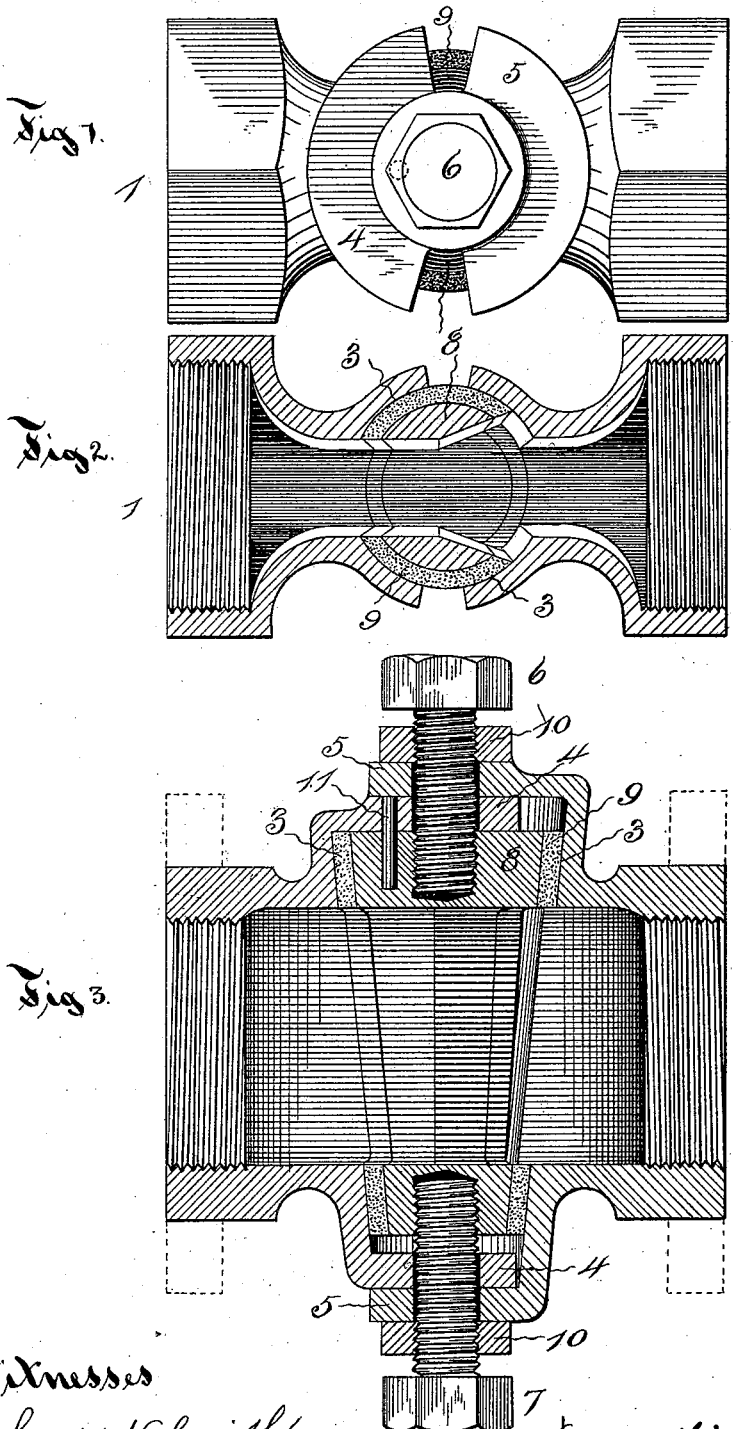
Witnesses
Scott H. Smith.
E. J. Hyde.
Inventor
Daniel W. Magee, by
Harry R. Williams
Atty.

UNITED STATES PATENT OFFICE.

DANIEL W. MAGEE, OF NEW YORK, N. Y.

FLEXIBLE PIPE-JOINT.

SPECIFICATION forming part of Letters Patent No. 551,193, dated December 10, 1895.

Application filed April 24, 1895. Serial No. 547,013. (No model.)

*To all whom it may concern:*

Be it known that I, DANIEL W. MAGEE, a citizen of the United States, residing at New York, in the county of New York and State of New York, have invented certain new and useful Improvements in Flexible Pipe-Joints, of which the following is a specification.

The invention relates to the class of flexible joints that are more particularly adapted and intended for use in those air and steam pipe systems attached to railway-cars in which the piping to be connected from car to car is provided with joints that give sufficient flexibility to the section between the cars to allow for the curves of the road or changes of level of the adjacent cars, without the use of hose-pipe.

The object of the invention is to provide a simple, cheap, and durable joint of this class, which can be always kept tight and which will have a straight way, so that the connection between the cars may be made without any sag that is liable to fill up and form a water-trap, or without turns that create resistance and prevent the fluid from passing freely through the piping from end to end of the system.

Referring to the accompanying drawings, Figure 1 is a plan of the joint. Fig. 2 is a horizontal section, and Fig. 3 is a vertical section, of the joint.

The shell of the joint is formed in two parts 1 and 2, that have threaded or flanged ends, as desired, for the attachment of the ends of the pipes that are to be joined. Each of the bodies of these parts is formed to have a particircular chamber 3 that extends across the direction of the passage through the joint, and at the ends of the chamber each part has the segmental flanges 4 and 5. The flanges are perforated for the passage of the pivot-bolts 6 and 7, and these flanges on one part are preferably farther apart than those on the other, so that the outside flanges will fit over the inner and allow the perforations to come into alignment for the passage of the pivot-bolts. Within the chamber that is formed between the two parts is placed a plug 8 that is preferably made tapering so that wear may be taken up and the joint easily kept tight, and between the outside of the plug and the inside walls of the chamber formed by the particircular bodies is a packing or lining 9. This packing or lining is in the form of a cylindrical sleeve or jacket and the outside is on the same taper as the walls of the body parts, while the inside is formed to closely fit the walls of the plug. Openings for the passage of fluid are made through the walls of this lining so as to correspond with the fluid-way through the plug, which is preferably wider on one side than the other in order to allow for more movement of the parts than could take place if the passage through the plug was straight and of equal width. The lining is preferably made of a molded composition of vulcanized rubber and asbestos, but of course any other suitable packing material may be used in forming this piece. The ends of the plug are bored and tapped for the reception of the straight ends of the pivot-bolts 6 and 7 that pass through the perforation in the flanges of the body parts. Fitted so as to turn on these bolts are the clamping-nuts 10 that are used to hold the bolts from working loose during use. A dowel-pin 11 is usually driven through one of the inner flanges into the plug so that the plug will not rotate with relation to that part of the shell to which it is thus pinned.

The plug and the lining are placed between the two parts and then the pivot-bolts are passed through the perforation in the flanges into the threaded-sockets in the ends of the plug. The bolt at the larger end of the plug is first turned until the plug is forced inward with sufficient force to cause the packing to make a tight joint between the plug and the shell, and then after the clamping-nut on this bolt is screwed down the other bolt is turned in and its clamping-nut screwed tight. The plug is held by the pin fixed with relation to one of the parts, but the other part is free to oscillate on the pivot-bolts for a limited distance each way, contact being made between the edges of the two parts before the fluid-way through the plug is opened to the exterior on either side, so that the parts cannot turn far enough to allow the escape of any fluid from the interior. If either of the parts should wear and any leak occur, the bolts may be quickly turned so as to drive the plug inward and thus again make a tight joint between the parts and prevent further leaking.

The joint is simple, cheap and easily used.

The flexibility of the joint can easily be regulated by the tightness of the screwing inward of the pivot-bolts, and the wear can be quickly taken up so that the device will not leak.

The joint is very durable, and if a number are placed in a pipe system in various positions a section will result, which has movement in all directions without the use of a flexible connecting-hose.

The fluid-way through this joint is unobstructed and free from all sharp turns and bends, so that fluid under low pressure will flow unretarded through the joint, and with this kind of a joint there are no parts in which liquid of condensation may collect and obstruct the passage or freeze.

I claim as my invention—

1. A flexible pipe joint consisting of a shell formed of two parts with overlapping flanges that are pivoted together so as to form a parti-circular chamber between the shell parts, a tapering plug with a fluid way, a lining surrounding the plug and located within the parti-circular chamber, and threaded pivot-bolts passing through the flanges into the plug for holding the parts of the shell together with the plug between them, substantially as specified.

2. A flexible pipe joint consisting of a shell formed of two parts that are pivoted together with a parti-circular chamber left between them, a tapering plug with a fluid-way and a lining surrounding the plug with corresponding fluid openings located within the parti-circular chamber, a pin passing from one part of the shell into the plug, threaded pivot bolts passing through the parts of the shell into the ends of the plug, and clamping nuts turning on the bolts, substantially as specified.

DANIEL W. MAGEE.

Witnesses:
SIDNEY J. H. HOWES,
FRANK FINN.